US009754015B2

(12) United States Patent
Kannan et al.

(10) Patent No.: US 9,754,015 B2
(45) Date of Patent: Sep. 5, 2017

(54) FEATURE RICH VIEW OF AN ENTITY SUBGRAPH

(71) Applicant: EXCALIBUR IP, LLC, New York, NY (US)

(72) Inventors: Balaji Kannan, Sunnyvale, CA (US); Aamod Sane, Sunnyvale, CA (US); Zhiwei Gu, Sunnyvale, CA (US); Michael Welch, Mountian View, CA (US)

(73) Assignee: EXCALIBUR IP, LLC, New York, NY (US)

( * ) Notice: Subject to any disclaimer, the term of this patent is extended or adjusted under 35 U.S.C. 154(b) by 524 days.

(21) Appl. No.: 13/685,366

(22) Filed: Nov. 26, 2012

(65) Prior Publication Data

US 2014/0149465 A1  May 29, 2014

(51) Int. Cl.
*G06F 17/30* (2006.01)
(52) U.S. Cl.
CPC .............................. *G06F 17/30604* (2013.01)
(58) Field of Classification Search
CPC .................................................. G06F 17/30604
USPC .............................. 707/798, E17.01; 382/224
See application file for complete search history.

(56) References Cited

U.S. PATENT DOCUMENTS

| | | | | |
|---|---|---|---|---|
| 5,623,541 A * | 4/1997 | Boyle | .................. | H04Q 3/0062 340/2.81 |
| 7,725,499 B1 * | 5/2010 | von Lepel | ............. | G06Q 30/02 707/791 |
| 9,201,980 B2 * | 12/2015 | Tealdi | ............... | G06F 17/30958 |
| 2009/0240487 A1 * | 9/2009 | Shen | .................. | G06F 17/2872 704/9 |
| 2009/0299990 A1 * | 12/2009 | Setlur et al. | ...................... | 707/5 |
| 2010/0179956 A1 * | 7/2010 | Jammalamadaka | | G06F 17/30389 707/748 |
| 2010/0241637 A1 * | 9/2010 | Kissner et al. | ............... | 707/752 |
| 2010/0257217 A1 * | 10/2010 | Warren | ............ | G06F 17/30115 707/822 |
| 2010/0332430 A1 * | 12/2010 | Caraviello | ............. | G06N 5/025 706/13 |
| 2011/0016114 A1 * | 1/2011 | Allen et al. | .................... | 707/726 |
| 2011/0078789 A1 * | 3/2011 | Kamasuka | ............ | G06F 21/608 726/20 |
| 2011/0106526 A1 * | 5/2011 | Nguyen et al. | ................... | 704/9 |
| 2011/0307436 A1 * | 12/2011 | Cai | ................... | G06F 17/30864 706/48 |

(Continued)

OTHER PUBLICATIONS

"Entity—Freebase"; http://wiki.freebase.com/wiki/Entity; Mar. 12, 2010.

(Continued)

*Primary Examiner* — Baoquoc N To
(74) *Attorney, Agent, or Firm* — James J. DeCarlo; Greenberg Traurig, LLP

(57) ABSTRACT

A data processing system employs a pre-processing step to create a simplified view of a received entity graph. During the pre-processing step, only the objects and the attributes of those objects within the graph that are required for data processing are selected. Pruned source and target objects are generated by omitting those attributes that are not required for processing. The pruned objects are included in the simplified view that enhances system performance.

16 Claims, 11 Drawing Sheets

(56) References Cited

U.S. PATENT DOCUMENTS

| | | | | |
|---|---|---|---|---|
| 2011/0311129 | A1* | 12/2011 | Milanfar | G06K 9/00335 382/154 |
| 2012/0197631 | A1* | 8/2012 | Ramani | G06F 17/2755 704/9 |
| 2012/0298852 | A1* | 11/2012 | Kawaguchi | H01J 49/0031 250/281 |
| 2013/0151543 | A1* | 6/2013 | Fan | G06F 17/30598 707/758 |
| 2015/0370993 | A1* | 12/2015 | Moturu | G06F 19/3437 703/6 |
| 2015/0370994 | A1* | 12/2015 | Madan | G06F 19/363 705/3 |

OTHER PUBLICATIONS

"Graph—Freebase"; http://wiki.freebase.com/wiki/Graph; Sep. 24, 2009.

"Graphd—Freebase"; http://wiki.freebase.com/wiki/Graphd; Jun. 10, 2010.

Hasegawa et al., "Discovering Relations Among Named Entities from Large Corpora"; 8 pgs.

Huard, "Google Tool Calculates 'Bacon Number'"; LemonGrovePatch; Sep. 14, 2012; http://lemongrove.patch.com/articles/google-tool-calculates-bacon-number.

* cited by examiner

FEATURE RICH VIEW OF AN ENTITY SUBGRAPH

The present disclosure relates to improving performance of a large scale graph processing system by creating a feature rich view of an entity graph.

BACKGROUND

Data from the real world is modeled in many ways to facilitate design and development of information systems. Among the different modalities employed by developers, entity-relationship diagrams (ERD) are popularly used for describing data and assumptions in the systems and are useful in designing associated databases. Entities are physical objects such as people, places, things or entities can also include concepts. Each entity refers to a single person, place, thing or concept and can be uniquely identified within an entity graph that connects the various entities together. Data or attributes of the entities are collected and modeled in the entity-relationship diagram. Physical objects such as a car, a customer or a concept such as a bank account, address or a transaction can each be uniquely identified. Moreover, modeling a real world system can include identifying various entities in the system and the defined relationships they have with each other. For example, in a banking system a customer entity owns an account entity or a customer (or an employee) entity can execute a transaction entity. Therefore, relationships provide the requisite structure to collect information associated with different entities. An entity-relationship diagram or an entity graph describes or illustrates the logical structure within the entities of a system by including entities at its nodes and relationships as interconnecting edges between the entities. A processing system can identify entities from received data requests and return the appropriate attributes related to the identified entities or it can walk along the edges (relationships) and return attributes of other related entities in order to accurately respond to the data requests.

SUMMARY

This disclosure is directed towards finding and eliminating duplicate data in entity graphs where the graph needs to be traversed at multiple places to get to neighbor attributes. Accordingly, method for de-duplication of entity graphs is disclosed in an embodiment. The method includes various steps executed by one or more processors. A processor receives an input entity graph comprising at least one object and a plurality of attributes of the object and a specification identifying a subset of the plurality of attributes required for constructing a view that expedites data processing. The method further comprises, selecting, by the processor from the input entity graph, the subset of the plurality of attributes required for the data processing; generating, by the processor, a pruned object comprising the subset of the plurality of attributes for inclusion into the view and generating the view comprising at least the pruned object.

In an embodiment, the one object comprises a plurality of objects and respective attributes such that the plurality of objects further comprise a source object and target objects that are neighbors of the source object in the input entity graph. In an embodiment, the target objects are N level neighbors of the source object, wherein N is greater than or equal to 1. The specification further identifies a subset of the plurality of objects required for data processing and the selecting step further comprises selecting, by the processor from the input entity graph, the subset of the plurality of objects required for the data processing wherein the subset comprises at least the source object. In an embodiment, the specification further identifies respective subsets of the attributes of the subset of the plurality of objects that are required for the data processing and the selecting step further comprises selecting, by the processor from the input entity graph, respective subsets of the attributes of the subset of the plurality of objects that are required for the data processing based on the specification.

In an embodiment, the specification further identifies respective subsets of the attributes of the plurality of objects that are required for the data processing and the selecting step further comprises selecting, by the processor from the input entity graph, respective subsets of attributes of the plurality of objects that are required for the data processing based on the specification. In this embodiment, the processor generates a pruned source object and pruned target objects comprising the respective subsets of the plurality of attributes and the generated view further comprises the pruned source object and the pruned target objects.

In an embodiment, the method further comprises receiving, by the processor, a request related to an object and the subset of the plurality of attributes and retrieving, by the processor, a response to the request from the view in a single iteration.

A computing device comprising a processor and a storage medium for tangibly storing thereon program logic for execution by the processor is disclosed in an embodiment. The program logic can comprise graph receiving logic for receiving, an input entity graph comprising at least one object and a plurality of attributes of the object, specification receiving logic, for receiving a specification identifying a subset of the plurality of attributes required for constructing a view that expedites data processing. Selecting logic, comprised within the program logic is executed by the processor, for selecting from the input entity graph, the subset of the plurality of attributes required for the data processing. The program logic further comprises object generating logic for generating a pruned object comprising the subset of the plurality of attributes for inclusion into the view and view generating logic for generating the view comprising at least the pruned object.

In an embodiment, at least one object comprises a plurality of objects and respective attributes, the plurality of objects further comprise a source object and target objects that are neighbors of the source object in the input entity graph. In an embodiment, the target objects are N level neighbors of the source object, wherein N is greater than or equal to 1.

In an embodiment, the specification further identifies a subset of the plurality of objects required for data processing and the selecting logic further comprises object selecting logic, executed by the processor for selecting from the input entity graph, the subset of the plurality of objects required for the data processing wherein the subset comprises at least the source object. In an embodiment, the specification further identifies respective subsets of the attributes of the subset of the plurality of objects that are required for the data processing and the selecting step further comprises attribute subset selecting logic, executed by the processor for selecting from the input entity graph, respective subsets of the attributes of the subset of the plurality of objects that are required for the data processing based on the specification. In an embodiment, the specification further identifies respective subsets of the attributes of the plurality of objects that are required for the data processing and the selecting step further comprises attribute subset selecting logic, executed by the processor for selecting from the input entity graph, respective subsets of attributes of the plurality of objects that are required for the data processing based on the specification such that a pruned source object and pruned target objects are generated. In an embodiment, the generated view further comprises the pruned source object and the pruned target objects.

A computer readable storage medium comprising instructions that can be executed by a processor is disclosed in an embodiment. The instructions when executed by a processor cause the processor to receive an input entity graph comprising at least one object and a plurality of attributes of the object, receive a specification identifying a subset of the plurality of attributes required for constructing a view that expedites data processing. The instructions further cause the processor to select from the input entity graph, the subset of the plurality of attributes required for the data processing, generate a pruned object comprising the subset of the plurality of attributes for inclusion into the view and generate the view comprising at least the pruned object.

In an embodiment, at least one object comprises a plurality of objects and respective attributes, the plurality of objects further comprise a source object and target objects that are N level neighbors of the source object, N being greater than or equal to 1. In an embodiment, the specification further identifies a subset of the plurality of objects required for data processing and the instructions further cause the processor to select from the input entity graph, the subset of the plurality of objects required for the data processing wherein the subset comprises at least the source object. In an embodiment, the specification further identifies respective subsets of the attributes of the subset of the plurality of objects that are required for the data processing and the instructions further cause the processor to select from the input entity graph, respective subsets of the attributes of the subset of the plurality of objects that are required for the data processing based on the specification.

In an embodiment, the specification further identifies respective subsets of the attributes of the plurality of objects that are required for the data processing and the instructions further cause the processor to select from the input entity graph, respective subsets of attributes of the plurality of objects that are required for the data processing based on the specification such that pruned source object and pruned target objects are generated. In an embodiment, the generated view further comprises the pruned source object and the pruned target objects.

These and other embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views.

DESCRIPTION OF EMBODIMENTS

Figure 1:
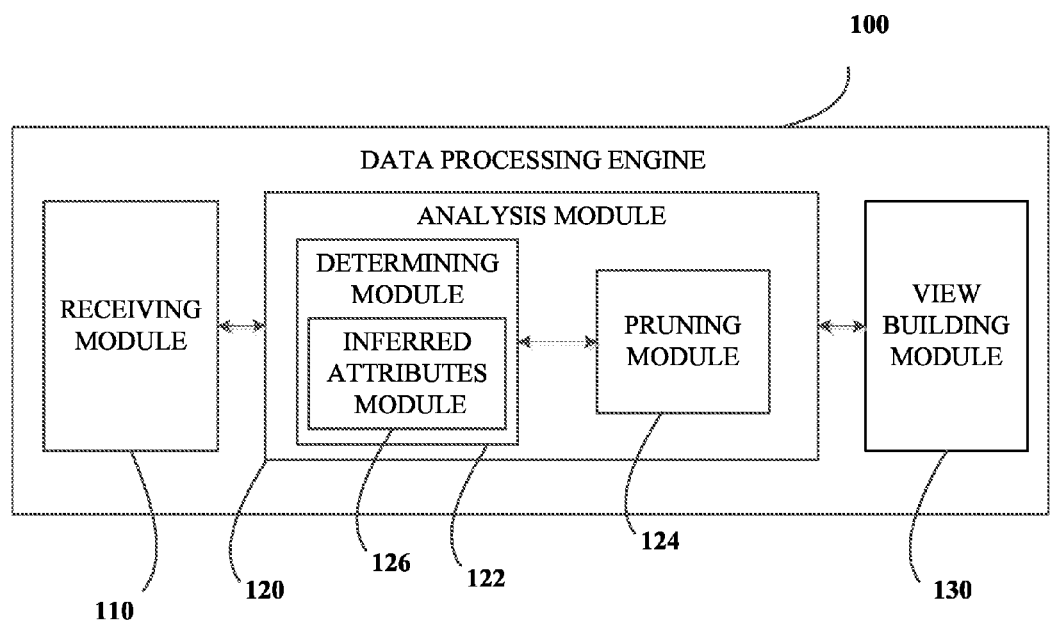
FIG. 1 is a block diagram depicting certain modules within a data processing engine in accordance with an embodiment of the present disclosure.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

In the accompanying drawings, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions or logic can be stored in a computer readable storage medium and provided to a processor of a general purpose computer, special purpose computer, ASIC, or other programmable data processing apparatus, such that the instructions or logic, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part. In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Typical entity relationship management and processing systems consume entities from various sources, identify duplicates and establish new relationship among existing entities. In order to execute such a task comprehensively, the system has to traverse the entity graph to obtain the actual attributes of interest prior to determining whether or not two entities are identical. For instance, there could be two person entities where both have the same name attribute, e.g., "Brad Pitt", with similar residential address, e.g., "Hollywood, Calif.". They may have different occupations. In this case, the occupation could be a first class entity (a separate occupation object/entity can be defined within the system) that is referred to by a pointer from the person entity. The actual attributes of the occupation entity related to the person entity can be retrieved only by traversing the relationship/edge connecting the person with occupation entity. Performing such walks on a large scale graph can have a bad performance impact. As an alternative, a very comprehensive person object could be built wherein all the needed attributes such as occupation are part of the person object to avoid graph traversal. The downside to this approach is that the objects can become very large and thereby still have a bad performance impact on a large scale graph processing system. Moreover, building such large objects can lead to the data set becoming de-normalized thereby causing problems with the data processing.

Various embodiments described herein are directed to minimizing graph traversal while maintaining normalized data sets by including a pre-processing step in the data processing pipeline that provides data to applications built on top of it. The pre-processing step selectively prunes the attributes of an object to keep only a minimum set of attributes that are needed for processing. In addition, the pre-processing step will provide the data processing system with an ability to walk through only certain edges of interest for a given source entity, collect the necessary attributes from the neighboring target entities and create a simplified view of the source entity with its neighbors.

Turning now to the figures, FIG. 1 is a block diagram depicting certain modules within a data processing engine 100. In accordance with one embodiment, the data processing engine 100 includes a pre-processing step as described above in order to increase its performance. The data processing engine 100 can include an receiving module 110 which receives an input entity graph comprising various objects or entities and their respective attributes. In an embodiment, the received input graph comprises data which is not associated with relational database management systems. For example, in an embodiment, the input entity graph obtained by the receiving module 110 can be associated with data from a FREEBASE knowledge base which is built from input received from various sources. Hence, in this embodiment, two seemingly disparate data entries can in fact refer to the same underlying data. For example, two data entries wherein one entry specifies a street address and another entry specifies a latitude/longitude can in fact refer to the same location. Accordingly, the data processing engine 100 is configured to de-dupe such entries and produce a compact data representation that enhances performance of a data processing apparatus.

As described supra, an object in an entity graph obtained by the receiving module 110 can model a real world entity such as a customer, an object or a concept such as a user account and the attributes can be the characteristics of the real world entities. In one embodiment, the various objects can include both a source object and its related target objects which can be N level neighbors of the source object wherein N≥1. The received input entity graph is transmitted by the receiving module 110 to the analysis module 120 which analyzes the graph and facilitates production of a feature rich view or a parcel that includes a view of the source object and its neighbors along with only the required attributes. The feature rich view or parcel is made available to various applications by the view building module 130 that consume its data for executing further tasks, such as satisfying user queries. In one embodiment, the feature rich view or parcel can remain within a database and be accessible to the applications. In one embodiment, the parcel or the feature rich view can be part of the applications. In either case, updates to the parcel can be rolled out either automatically on a periodic basis or manually as determined by a user, such as a database administrator.

In one embodiment, the analysis module 120 further includes a determining module 122 which determines the specific subset of objects of a received input entity graph and respective attributes needed for various data processing routines. Different processing routines can be executed on the same data within a given database and different processing routines can have different data that is necessary for executing the routines. For example, a movie database can have processing routines executed on it for processing data related to movies, current headlines, actors, venues/timings of various shows, premier events etc. Thus, for a data processing routine associated with a movie premier event, the career statistics of an actor named "Brad Pitt" attending the premier but not featured in the movie may not be necessary. In this case, information such as, venue, timing of the premier may be determined as being necessary for data processing. However, the career statistics such as, number of movies may be necessary in another data processing routine executed in association with the same movies database and which may involve de-duplicating the actor "Brad Pitt" from another person named "Brad Pitt" who is also included in the movies database but may not be an actor. Thus, different data processing routines act on different objects and/or attributes from the same database. In a further embodiment, the determining module 122 not only provides a determination regarding the explicitly defined/existing attributes of the objects but the determining module 122 but can also provide a determination regarding attributes required for data processing and which are to be inferred from existing data. Therefore, an inferred attributes module 126 is comprised within the determining module 122 to provide such inferred attributes that are required for data processing. For example, for a given actor object, the derived attribute according to this embodiment can include total number of films, maximum grossing film or other statistics or even new attributes such as, "acted with" can also be defined.

In an embodiment, the data or information necessary for a data processing routine is obtained by the determining module 122 from a specification received by the receiving module 110 from an external agent. For example, the specification can be provided by a human operator to the data processing engine 100 earlier in the data processing pipeline. In an embodiment, the specification can be automatically generated by the determining module 122 itself via various statistical techniques, such as cosine similarity, which are employed for automatically determining which of the attributes of the objects/entities need to be retained for different data processing routines. Based on comparison of the cosine similarity between two entities/objects with predetermined thresholds, the attributes that are most pertinent to the relationship between the two entities/objects can be determined and accordingly be identified as attributes to be retained. Thus, certain rules can be defined in the specifications which can be applied to de-dupe data in an input entity graph obtained by the receiving module 102.

The pruning module 124 within the analysis module 120 selects only such objects that are determined as being necessary for processing by the determining module 122. In an embodiment, only a subset of attributes of a selected object can be identified by the determining module 122 as being necessary for processing. Accordingly, the pruning module 124 selects only such subset of attributes of the selected objects thereby generating pruned versions of the objects from the original objects included in the input entity graph obtained by the receiving module 110. The remaining objects and/or attributes which are not determined to be necessary for processing are not selected by the pruning module 124. Thus, the pruning module 124 facilitates generation of pruned version of the input graph by selecting only a subset of the objects and/or subsets of their respective attributes. In an embodiment, the selected objects can include one or more source objects and the target objects. The target objects can be immediate neighbors of the source objects. In an embodiment, the target objects are not immediate neighbors of the source objects and may be N level neighbors of the source objects wherein N≥1. The pruning module 124 thus facilitates pruning the input entity graph by determining which of the source and target objects and respective attributes comprised therein are necessary for processing. The received input entity graph thus edited is supplied to the view building module 130 that builds a parcel or a feature rich view and makes it available for subsequent processing tasks.

Figure 2:
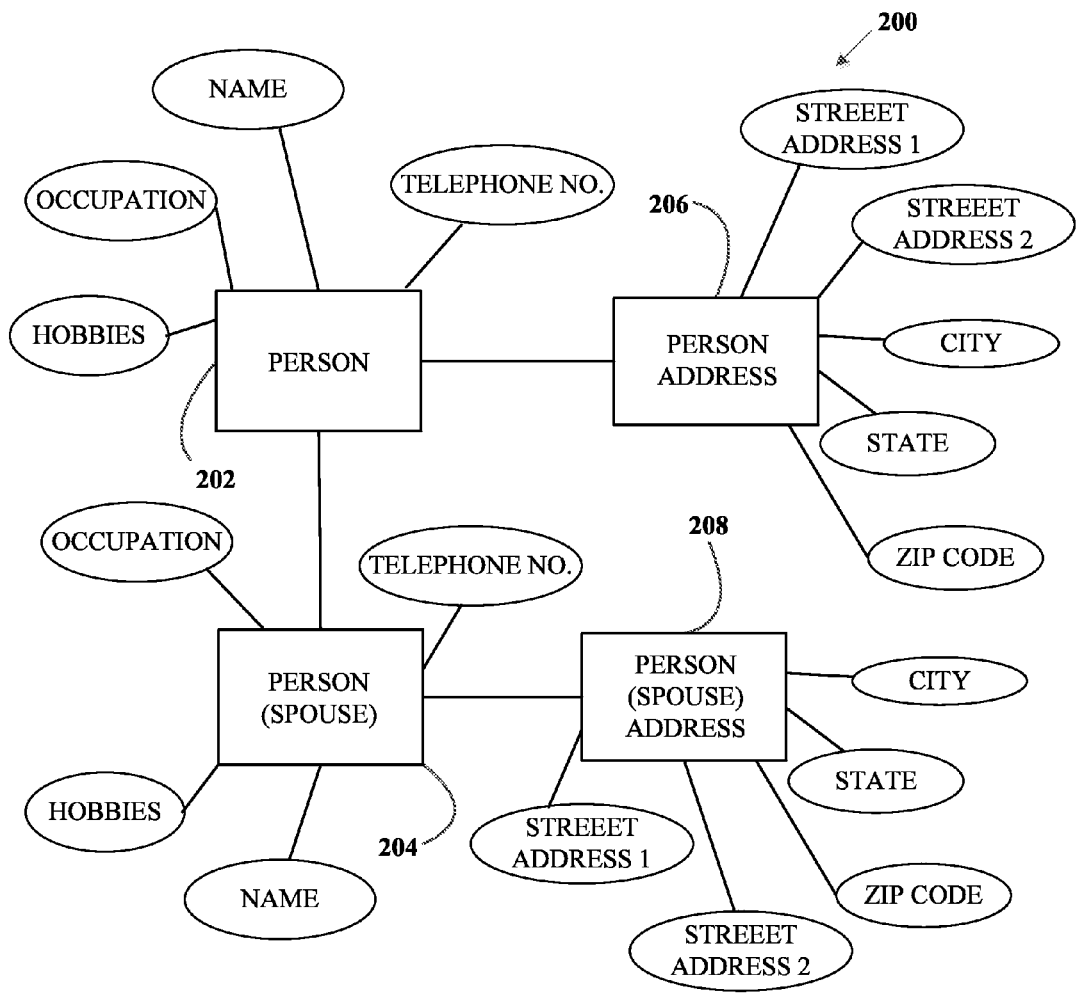
FIG. 2 is a schematic diagram of an input entity graph employed for view building in accordance with an embodiment of the present disclosure.

FIG. 2 is a schematic diagram of an input entity graph 200 that is employed for view building in accordance with various aspects described herein. The input entity graph 200 comprises a plurality of objects including a source object, namely the person object 202 and N level (N≥1) target objects 204, 206 and 208 of the person object 202. In particular, the target objects include a person (spouse) object 204, a person address object 206 associated with the person object 202 and a person (spouse) address object 208 associated with the person (spouse) object 204. In an embodiment, each of the objects 202, 204, 206 and 208 comprises a reference to its first level neighboring object. The person object 202 comprises references to the person address object 206 and the person (spouse) object 204 while the person (spouse) object 204 includes references to the person object 202 and the person (spouse) address object 208. Thus, when the address of a person's person (spouse) needs to be retrieved, the person object 202 can be the source object and the person (spouse) address object 208 can be a second level neighbor of the person object 202 or N=2 target object. Accordingly, the spouse address of the person will be retrieved in two iterations of a data processing system (not shown) when starting from the person object 202. In an embodiment, when the input entity graph 200 is employed to retrieve a person's spouse address, the data processing system can commence with the person object 202 and retrieve the person (spouse) object 204 in the first iteration and the person (spouse) address object 208 will be retrieved in the subsequent second iteration. Thus, it can be appreciated that when a large entity graph comprising a complex network of entities is analyzed, such multiple-step iterations can negatively impact the performance.

Figure 3:
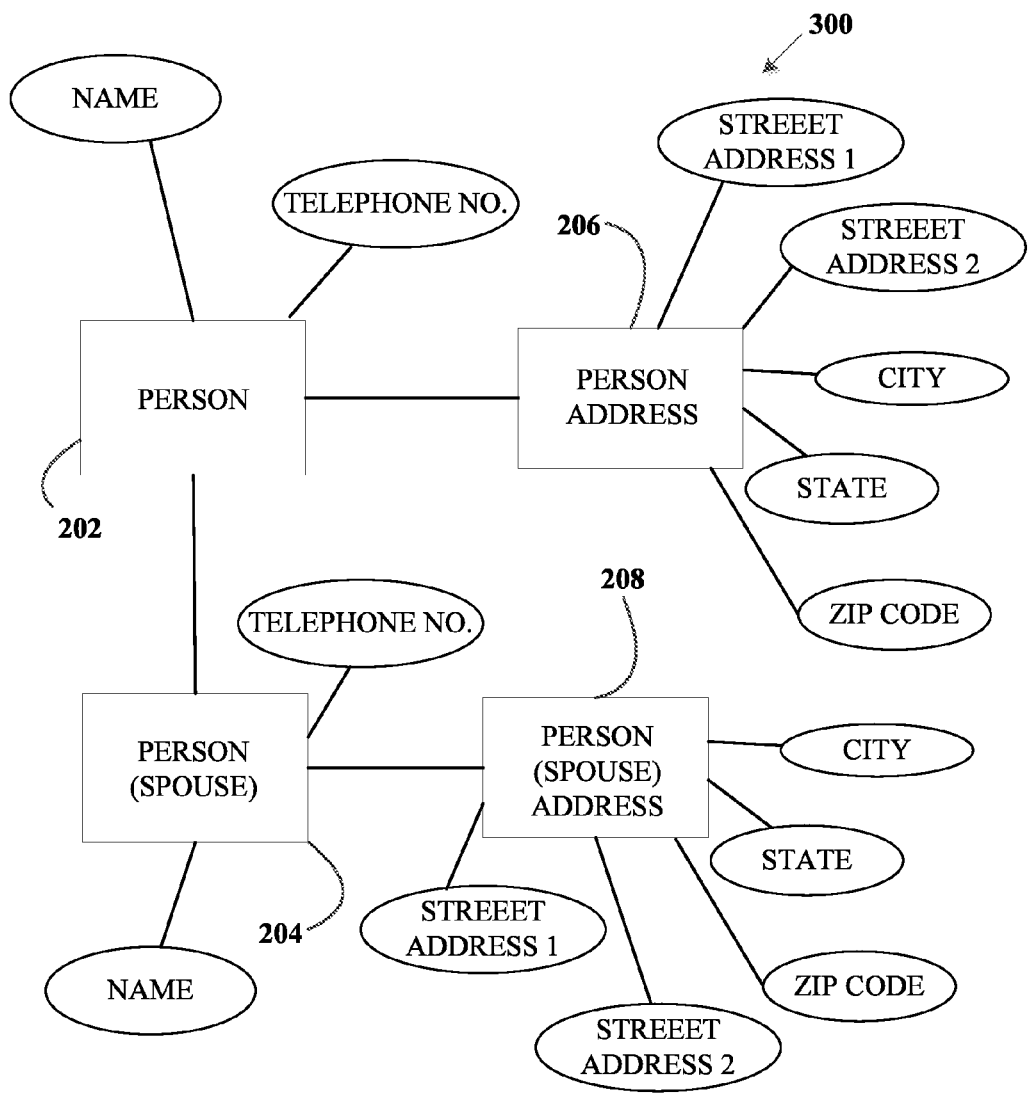
FIG. 3 is a schematic diagram of a entity graph generated by the data processing system/engine from the input entity graph in accordance with an embodiment of the present disclosure.

FIG. 3 is a schematic diagram of an entity graph 300 that can be generated by the data processing system/engine 100 from the input entity graph 200 in accordance with embodiments described herein. In an embodiment, the objects and attributes required for data processing routines are identified in particular specifications provided to a data processing apparatus. In an embodiment, the input entity graph 200 is analyzed based on various statistical techniques, such as cosine similarity, to identify a subset of objects and their attributes from the objects 202, 204, 206 and 208 that are required for processing. In an embodiment, it is initially determined that the attributes hobbies and occupation of the source object 202 are not required for processing. Therefore, these attributes not selected for inclusion into the pruned version of the source object 202 during the process of simplifying the input entity graph 200. In addition, it is also determined that the hobbies and occupation attributes of a target person (spouse) object 204 are also not required for processing and hence these attributes also trimmed or are not selected while simplifying the graph. As mentioned herein, new attributes can also be derived or inferred from existing attributes during the process of simplifying the input entity graph 200. A resultant view comprising a simplified graph 300 with only the objects and/or respective attributes of interest including inferred or derived attributes therein is created in accordance with an embodiment. Thus, one or more of the source attributes and target attributes can be discarded for simplifying a received entity graph by executing one or more of source and target pruning operations.

Figure 4:
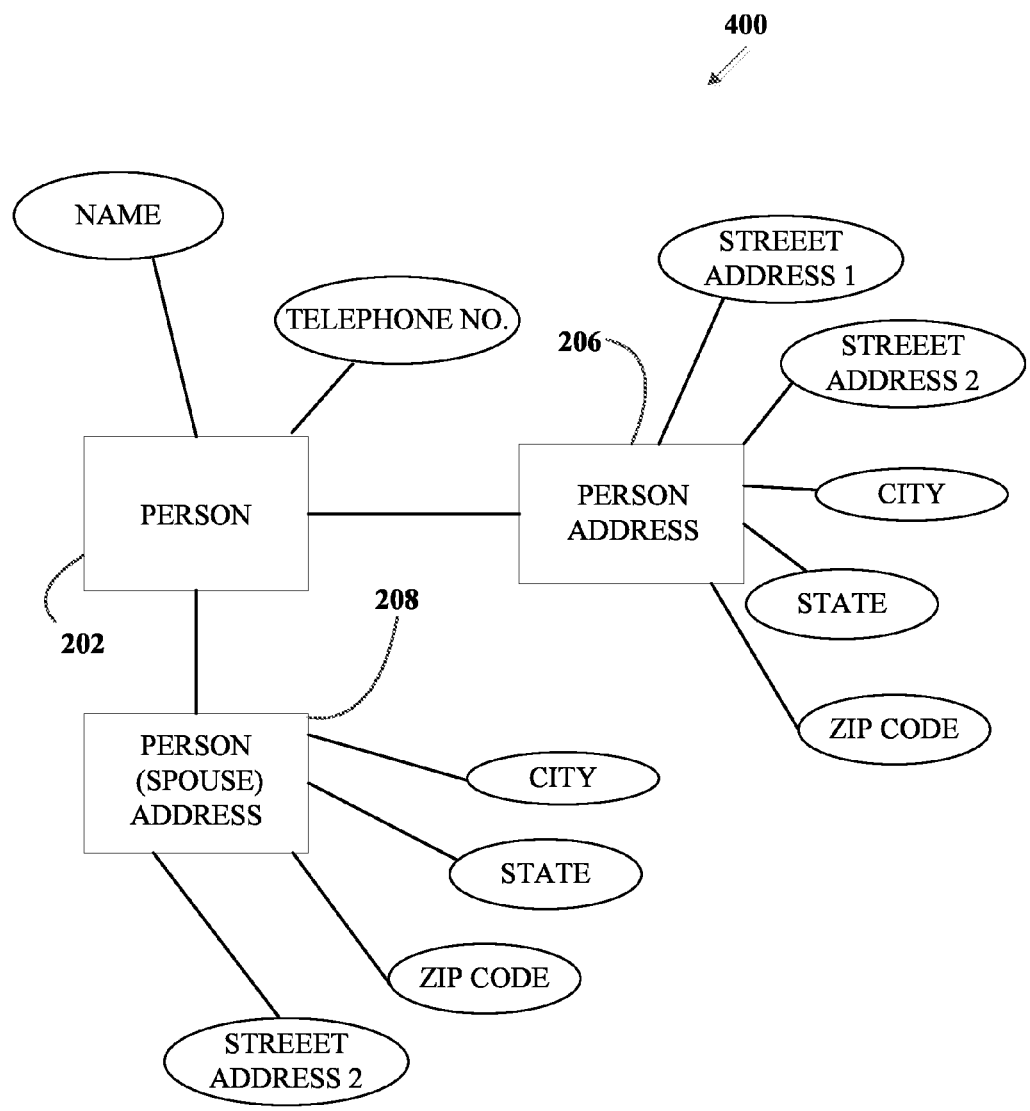
FIG. 4 is a schematic diagram illustrating a further simplified view of the input entity graph in accordance with an embodiment of the present disclosure.

FIG. 4 is a schematic diagram illustrating a further simplified view 400 of the input entity graph 300 in accordance with an embodiment. For example, if it is determined that a person's spouse address is to be retained based on a received specification or various statistical techniques described herein, the entity graph 300 can be further simplified by pruning not only the inessential attributes, but also inessential objects. In an embodiment, the person object 202 can be modified to remove the reference to the intermediate person (spouse) object 206 and instead to include a reference to the person (spouse) address object 208. Thus, a further trimmed or pruned version 400 of the entity graph 300 is generated by omitting the person (spouse) object 204 entirely and moving the person (spouse) address object 208 to the same node as the person object 202. When a data processing system/engine 100 acts on the simplified view 400 to retrieve spouse address, it can be retrieved in a single iteration. This is in contrast to the two-step process described supra with respect to FIG. 2 for retrieval of the same information. Therefore creation of a simplified view by source and target pruning can enhance system performance not only by reducing the number of steps but also by reducing the data stored within the data processing system.

Figure 5:
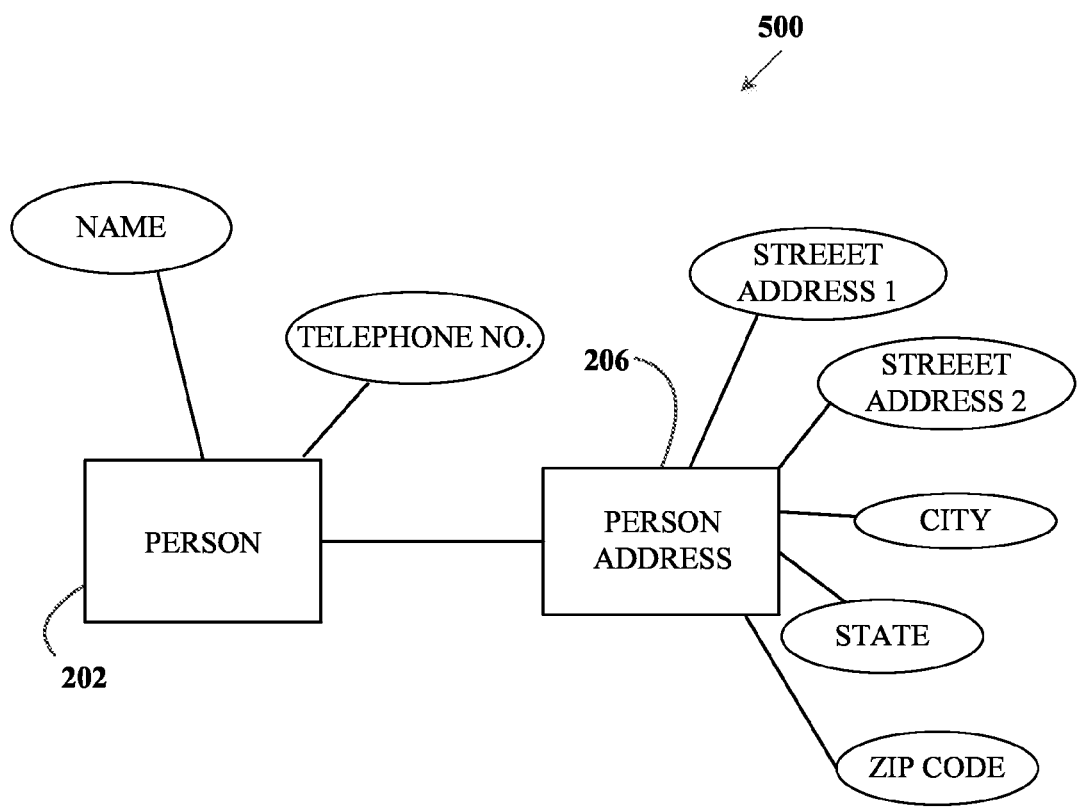
FIG. 5 is a schematic diagram illustrating a more simplified view of the input entity graph that is created if it is determined that the person address is identical to the person (spouse) address in accordance with an embodiment of the present disclosure.

FIG. 5 is a schematic diagram illustrating a more simplified view 500 of the input entity graph 200 created if it is determined that the person address is identical to the spouse address in the situation described supra with respect to FIG. 4. More particularly, if it is determined that the person (spouse) address object 208 of a person object 202 has the same attributes as the person address object 204, then the view 400 can be further simplified by trimming the person (spouse) address object 208 entirely and retaining only the trimmed person object 202 with the person address object 206. Such de-duplication of data further simplifies the view walked by a data processing system/engine 100 to retrieve required data thereby enhancing system performance.

Data processing systems and methodologies disclosed herein thus address two issues in finding duplicates in entity graphs where there is a need to traverse the graph at multiple places to get to the neighbor attributes. A pre-processing step is employed, which selectively prunes the attributes of an object that are not of interest to keep only the minimum set of attributes that are needed for processing. In addition the data processing systems in accordance with embodiments described herein have the ability to walk through only certain edges of interest for a given source entity, collect the necessary attributes from the neighboring target entities and creates a simplified view of the entity with its neighbors. In one embodiment, the system is built using Mapreduce framework to collect the neighbors for every object in an input graph. The system takes in a configuration file which contains a mapping between the object and the attributes that are to be retained from an object. This configuration is split into three parts:

1) Source pruning—wherein a source object is trimmed so that it retains only a list of attributes required for processing;

2) Target pruning—wherein a target object determined to be of interest in processing is trimmed so that it retains only a list of attributes required for processing;

3) View Building—building a view of the pruned source and target objects with the necessary attributes.

In an embodiment, the application based on Mapreduce framework embedded into a data processing apparatus will then do the job of bringing in all the pruned objects and their associated neighbors to the same node. The application, in this embodiment, is robust enough to bring in N level neighbors and not necessarily the immediate neighbors only. In the example described supra with respect to FIGS. 2-5, if a data processing engine 100 needs to retrieve the address of the person (spouse) object 204, the data processing engine 100 gets the person (spouse) object 204, a first level neighbor of a person object 202, and then gets the address of the spouse (second level neighbor) in a single iteration of the execution of the map-reduce job.

In one embodiment, after computing the N level neighbors for an object, the data processing system/engine 100 uses an approach similar to object relational (O/R) mapping used in the database world where a view of an object is created from a database row. In this embodiment, the data processing system/engine 100 uses simple configurations to construct a view of the object and its neighbors by using the view building configuration to automatically select and transform an input entity sub graph into a feature rich object which is known as "parcel". It can be appreciated that source and target pruning methods described herein can occur in one step or they can occur cyclically in a plurality of steps wherein intermediate entity graphs of different granularities are produced at each step. In one embodiment, the intermediate graphs can be stored if they can be used for other data processing routines. In an embodiment, the intermediate graphs can be discarded until an entity graph of the required granularity is obtained. In an embodiment, the granularity of the resultant entity graph can be defined in a predetermined specification received by the data processing engine 100. In an embodiment, the granularity can be automatically determined according to embodiments described supra with respect to the analysis module 120.

Figure 6:
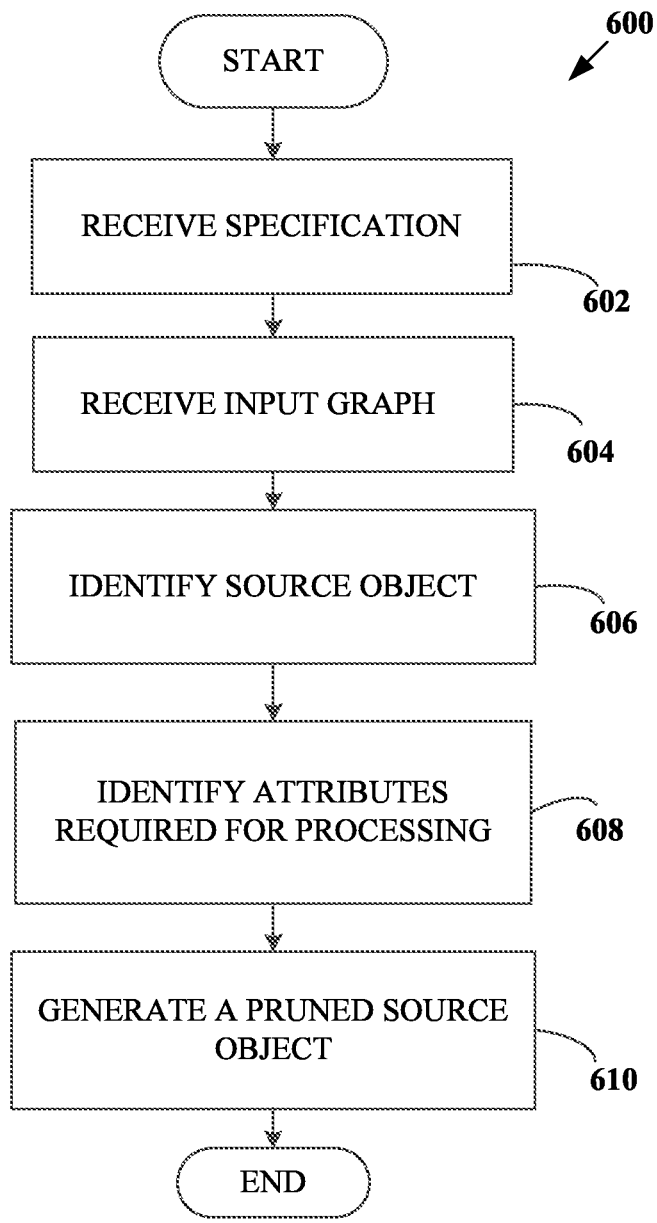
FIG. 6 shows a flowchart illustrating a method of source pruning wherein only attributes required for processing are retained in accordance with an embodiment of the present disclosure.

FIG. 6 shows a flowchart 600 illustrating an embodiment of a method of source pruning wherein only attributes required for processing are retained and attributes determined to be unnecessary for processing are pruned or are not selected. The method begins at 602 wherein a specification for building a view is received. In one embodiment, a predetermined specification can be received by the data processing engine 100 and the determining module 122 can identify the source/target objects required for processing from the specification. In an embodiment, the specification can be generated by the determining module 122 based on the data processing routine requesting the view by employing statistical procedures detailed supra. At 604 an input entity graph/sub-graph based on which a view is to be built is received. At 606, one or more source object(s) are identified. In an embodiment, based on the data to be processed, a source object or entity in a graph are automatically identified at 606. It can be appreciated that the flowchart shows a single source object as being identified at 606 only by the way of illustration and not limitation and that a plurality of source objects can be identified at 606 based on the received specification. In an embodiment, the identity of the source object can be supplied by a specification or rules input to the data processing engine 100 as shown at 602. As discussed supra, when data being processed relates to an individual person, an object or entity representing an individual person e.g., person object 202 will be identified at 606 as the source object.

At 608, attributes of the source object that are required for data processing are identified. A source object/entity in the original input entity graph can comprise a large number of attributes modeling various aspects of the object. For example, the person object 202 can have a large number of attributes modeling professional, personal, social or other aspects of the individual person. Therefore, at 608 it is determined which of the various attributes are to be retained for processing data related to the individual based on the specification or rules received at 602.

At 610, a pruned version of the source object is created by selecting or including in the pruned version only the required attributes and the remaining attributes that are not determined as being required for data processing are pruned or removed or are remain un-selected for inclusion with the pruned source object. For example, when it is determined via the statistical methods at 606 that only personal attributes of the person object 202 are required, other attributes related to the social and professional aspects are excluded from selection at 606 to generate a pruned source object at 608.

Figure 7:
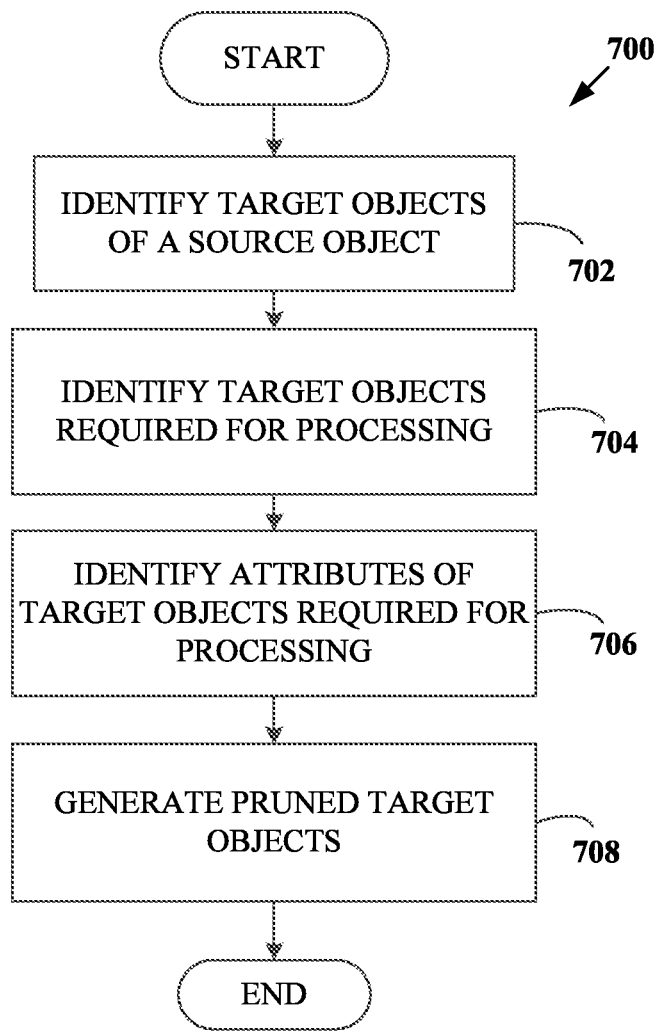
FIG. 7 shows a flowchart illustrating a method of target pruning in accordance with an embodiment of the present disclosure.

FIG. 7 shows a flowchart 700 illustrating an embodiment of a method of target pruning In one embodiment, the process of target pruning detailed in flowchart 700 occurs subsequent to identification of the source object at step 606 in FIG. 6. In different embodiments, the process of pruning target objects can occur subsequent to or concurrently with the process of source object pruning. The method begins with 702 wherein the target objects of a source object (identified as detailed in FIG. 6 above) are identified from the input entity graph based on the received specification. In an embodiment, the source object/entity also includes a reference to a target object. In the example detailed with respect to FIG. 6, if the personal data of the person object 202 is being analyzed, then the target objects can comprise personal details or characteristics of the individual person modeled as objects. For example, in the data discussed in FIGS. 2-5, the person address object 206 and the person (spouse) object 204 can be considered as target objects that model such personal details and are immediate neighbors of the source object, namely the person object 202. However, in an embodiment, the target objects identified at 702 can also comprise, second, third . . . or N level neighbors of the source object. Referring to the aforementioned example of the person object 202, the person (spouse) address object 208 can be considered a second level neighbor or N=2 target object of the person object 202 with an intermediate person (spouse) object 204 as the first level or N=1 neighbor. Thus, all the target objects up including N level neighbors (wherein N is a natural number and N=1, 2, 3 . . . ) of the source object are identified at 702.

At 704, among the target objects/entities identified at 702, those objects and required for processing are further identified. Referring again to the example of the person object 202, if the data to be processed requires only the address details related to the person object 202, then only the address object 206 and the person (spouse) address object 208 will be recognized at 704 as being required for processing. In one embodiment, for target objects selected as required for processing, all attributes can be identified at 706 as required for processing. In one embodiment, only a subset of specific attributes can be identified at 706 as required for processing. For example, in the address object 206 of the person, only the attributes 'street address 1', 'city', 'state' and 'zip code' can be determined as required for processing while the attribute 'street address 2' may not be identified as being necessary for data processing at 706.

At 708, pruned versions of respective target objects are generated by selecting only the required attributes or inferring/deriving necessary attributes of selected objects and leaving un-selected those objects and/or attributes that are not determined to be necessary for processing at 704 and 706. Thus, at 704 only the address object 204 and the person (spouse) address object 208 are determined to be necessary for processing and the intermediate first level neighbor, the person (spouse) object 206 which is not determined to be necessary for processing remains un-selected at 704 and is left out of the view that is to be built from the initial input entity graph.

Figure 8:
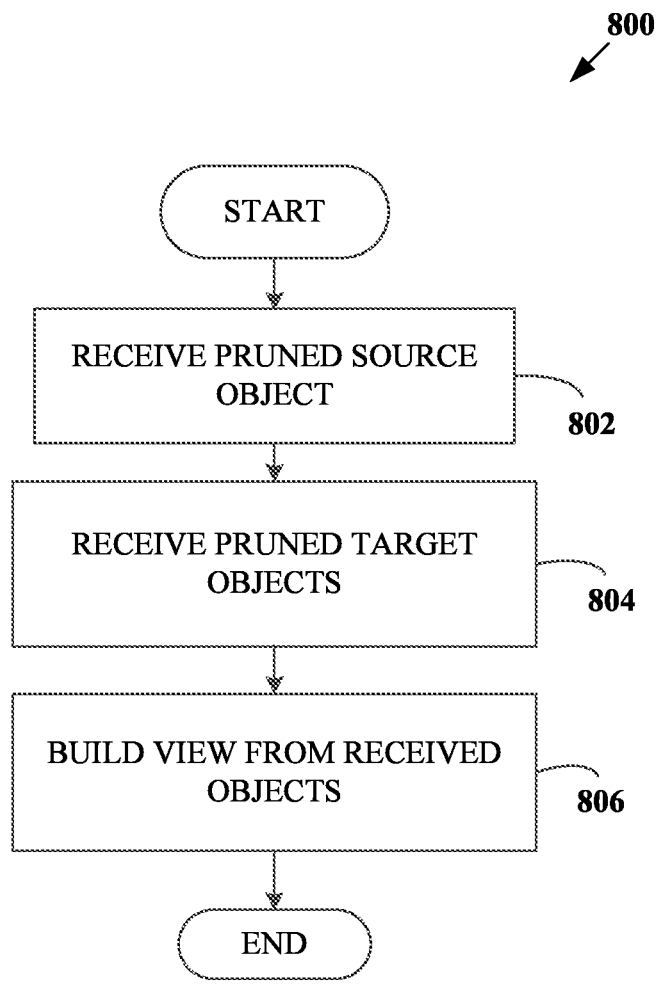
FIG. 8 shows a flowchart illustrating a method of generating a view in accordance with an embodiment of the present disclosure.

FIG. 8 shows a flowchart 800 illustrating an embodiment of a method of generating a view in accordance with one embodiment. At 802, one or more pruned source object(s) are received. A source object is identified, for example, from a predetermined specification input to the data processing system/engine 100 and those attributes of the source object that are not recognized as being necessary for processing are removed to create a pruned source object. At 804, selected and pruned target objects of the source object that are recognized for processing along with their respective attributes which are also identified as necessary for processing are received. A view or parcel of the source object(s) along with the pruned target objects is created at 806. In one embodiment, the view arranges all the pruned source and target objects to optimize graph traversal, for example, by bringing all the objects in the view to the same node. In one embodiment, if an intermediate neighboring object/entity is deleted then the source object/entity can be modified to remove the reference to the intermediate neighbor and it can be modified to include a reference to the target object that is determined to be required for processing and which is brought to the same node as the source object. Thus, generation of a view in accordance with different aspects described herein will require the data processing engine 100 to traverse the entity graph edges only once at the beginning of the graph processing pipeline. All the stages in the pipeline work on the feature rich view generated in accordance with this embodiment to do the necessary processing to identify duplicates in the system which allows graph disambiguation to be performed without actually materializing all the nodes and their neighboring information.

Figure 9:
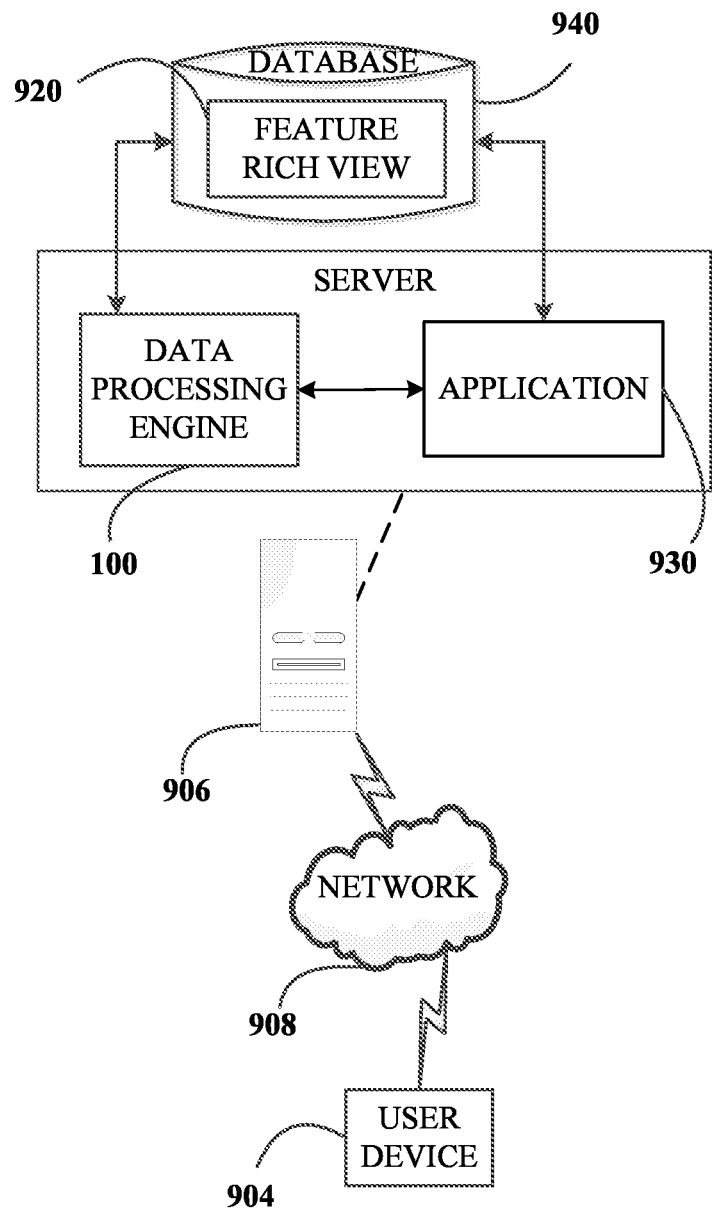
FIG. 9 shows a communication system employing a data processing engine in accordance with an embodiment of the present disclosure.

FIG. 9 shows an embodiment of a communication system 900 employing a data processing engine 100 in accordance with various aspects described herein. It may be appreciated that the use of the data processing engine 100 in FIG. 9 is provided only by the way of illustration and not limitation and that the data processing engine 100 can also be used in other systems currently existing or to be invented. FIG. 9 shows a computing device 904 employed by a user for communicating with a server 906 via a network 908 such as the Internet, WAN (Wide Area Network), LAN (Local Area Network) or other network. The server 906 can be a software executing on another computing device in accordance with embodiments described herein and comprises at least the data processing engine 100 and an application 930. Again it may be appreciated that the data processing engine 100 is shown as being included in the server 906 only by the way of illustration and not limitation and that the data processing engine 100 can be comprised on a disparate server and may still be employed within the communication system 900. The data processing engine 100 builds a feature rich view 920 from data existing within the database 940. Again, the feature rich view 920 is shown as comprised within the database 920 only by the way of illustration. In an embodiment, the feature rich view 920 can also be part of the server 906 or the feature rich view 920 can be included within another component such as the application 930 which is communicatively coupled to the data processing engine 100. The data processing engine 100 can be configured to build or update the feature rich view 920 automatically on a periodic basis, for example, on a daily basis according to one embodiment. The data processing engine 100 can also be configured to build/update the feature rich view 920 in response to specific process triggers such as, a user request. In an embodiment, the server 906 is configured to execute an application 930 which interacts with a user device 904 and employs the data processing engine 100 or more particularly, the feature rich view 920 for data retrievals or manipulation during such interactions. In particular, the application 930 retrieves the required data from the feature rich view 920 which includes the pruned objects instead of from the original entity graph thereby providing responses quickly due to the enhanced system performance as the number of graph traversals to retrieve the data from the feature rich view 920 can be considerably less than those required to retrieve the data from the original entity graphs within the database 940. In an embodiment, the server 906 can be configured to directly supply information to the user device 904 from the feature rich view 920 either in response to receiving a user query or automatically based on periodic routines or specific process triggers.

Figure 10:
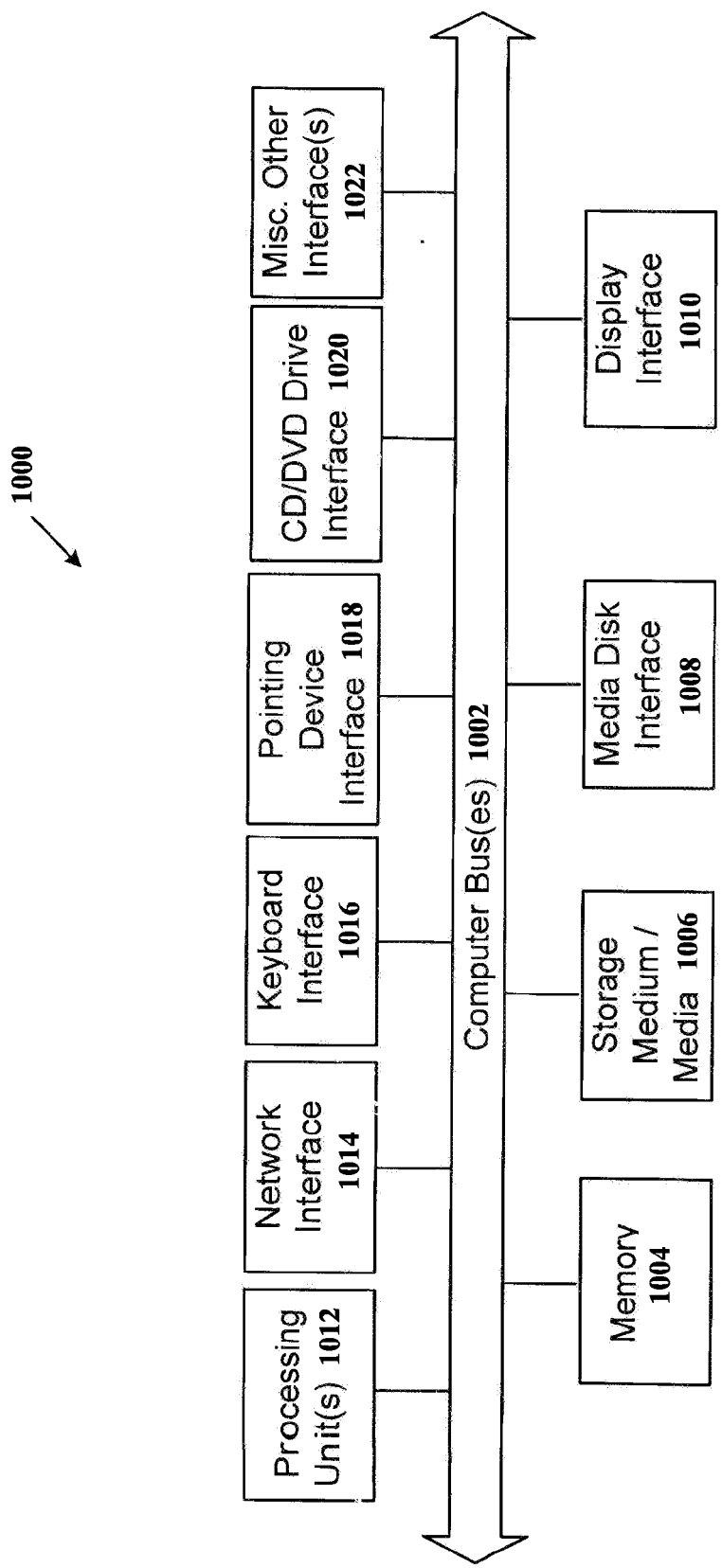
FIG. 10 illustrates internal architecture of a computing device in accordance with embodiments described herein.

FIG. 10 illustrates internal architecture of a computing device 1000 in accordance with embodiments described herein. It may be appreciated that the internal architecture of the computing device 1000 is only provided for better describing the subject matter and that any other computing device currently existing or to be invented can be used to generate or employ a data processing engine 100 described herein. The computing device 1000 includes one or more processing units (also referred to herein as CPUs) 1012, which interface with at least one computer bus 1002. Also interfacing with computer bus 1002 are persistent storage medium/media 1006, network interface 1014, memory 1004, e.g., random access memory (RAM), run-time transient memory, read only memory (ROM), etc., media disk drive interface 1008, an interface 1020 for a drive that can read and/or write to media including removable media such as floppy, CD-ROM, DVD, etc., media, display interface 1010 as interface for a monitor or other display device, keyboard interface 1016 as interface for a keyboard, pointing device interface 1018 as an interface for a mouse or other pointing device, and miscellaneous other interfaces 1022 not shown individually, such as parallel and serial port interfaces, a universal serial bus (USB) interface, and the like.

Memory 1004 interfaces with computer bus 1002 so as to provide information stored in memory 1004 to CPU 1012 during execution of software programs such as an operating system, application programs, device drivers, and software modules that comprise program code or logic, and/or computer-executable process steps, incorporating functionality described herein, e.g., one or more of process flows described herein. CPU 1012 first loads computer-executable process steps or logic from storage, e.g., memory 1004, storage medium/media 1006, removable media drive, and/or other storage device. CPU 1012 can then execute the stored process steps/logic of the loaded computer-executable process. Stored data, e.g., data stored by a storage device, can be accessed by CPU 1012 during the execution of computer-executable process steps.

Persistent storage medium/media 1006 is a computer readable storage medium(s) that can be used to store software and data, e.g., an operating system and one or more application programs. Persistent storage medium/media 1006 can also be used to store device drivers, such as one or more of a digital camera driver, monitor driver, printer driver, scanner driver, or other device drivers, web pages, content files, metadata, playlists and other files. Persistent storage medium/media 1006 can further include program modules and data files used to implement one or more embodiments of the present disclosure.

Figure 11:
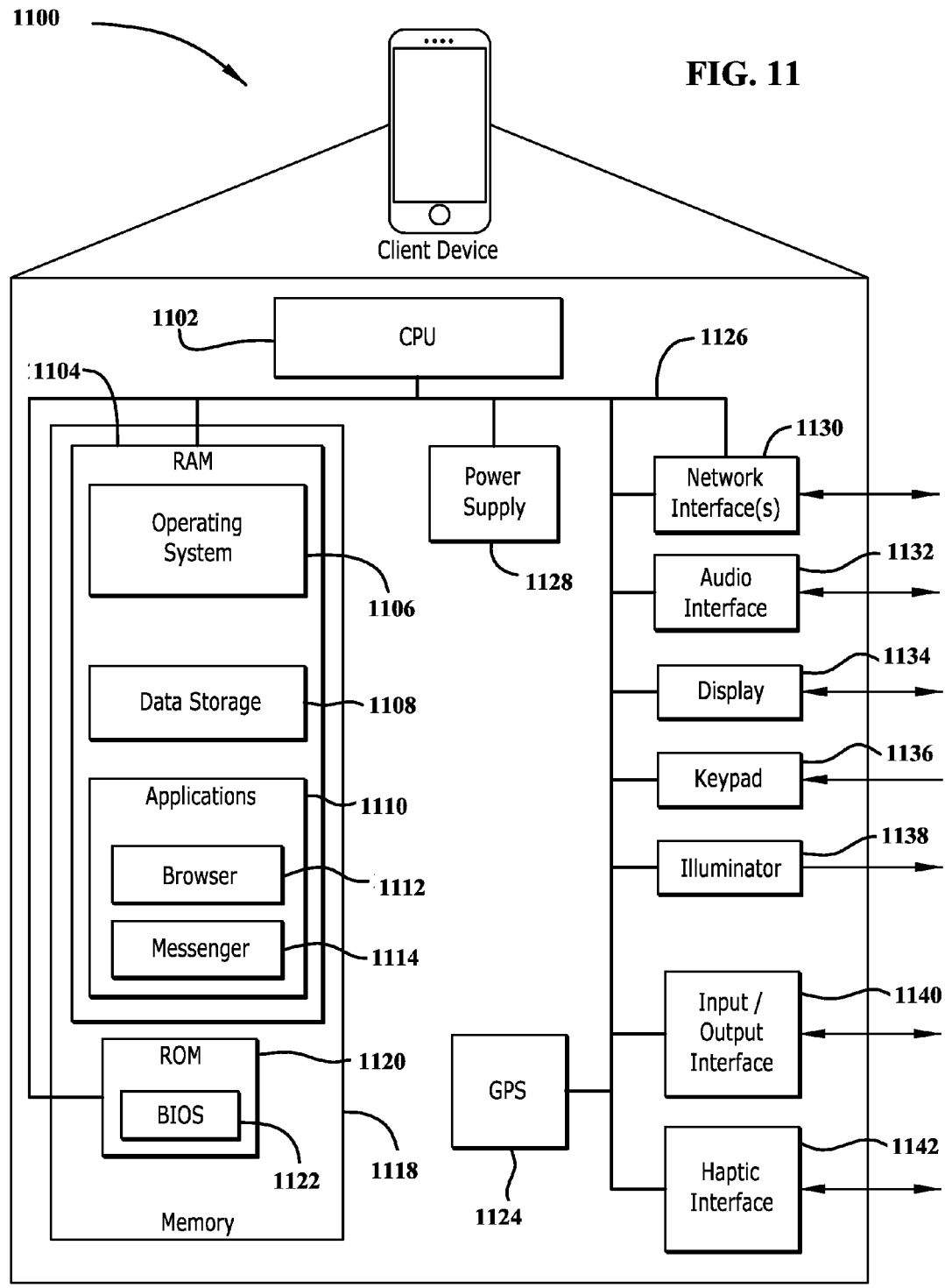
FIG. 11 is a schematic diagram illustrating a client device implementation of a computing device in accordance with embodiments of the present disclosure.

FIG. 11 is a schematic diagram illustrating a client device implementation of a computing device in accordance with embodiments of the present disclosure. A client device 1100 may include a computing device capable of sending or receiving signals, such as via a wired or a wireless network, and capable of running application software or "apps". A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like.

A client device may vary in terms of capabilities or features. The client device can include standard components such as a CPU 1102, power supply 1128, a memory 1118, ROM 1120, BIOS 1111, network interface(s) 1130, audio interface 1132, display 1134, keypad 1136, illuminator 1138, I/O interface 1140. Claimed subject matter is intended to cover a wide range of potential variations. For example, the keypad 1136 of a cell phone may include a numeric keypad or a display 1134 of limited functionality, such as a monochrome liquid crystal display (LCD) for displaying text. In contrast, however, as another example, a web-enabled client device 1100 may include one or more physical or virtual keyboards 1136, mass storage, one or more accelerometers, one or more gyroscopes, global positioning system (GPS) 1124 or other location identifying type capability, Haptic interface 1142, or a display with a high degree of functionality, such as a touch-sensitive color 2D or 3D display, for example. The memory 1118 can include Random Access Memory 1104 including an area for data storage 1108.

A client device may include or may execute a variety of operating systems 1106, including a personal computer operating system, such as a Windows, iOS or Linux, or a mobile operating system, such as iOS, Android, or Windows Mobile, or the like. A client device 1100 may include or may execute a variety of possible applications 1110, such as a client software application 1114 enabling communication with other devices, such as communicating one or more messages such as via email, short message service (SMS), or multimedia message service (MMS), including via a network, such as a social network, including, for example, Facebook, LinkedIn, Twitter, Flickr, or Google+, to provide only a few possible examples. A client device 1100 may also include or execute an application to communicate content, such as, for example, textual content, multimedia content, or the like. A client device 1100 may also include or execute an application 1112 to perform a variety of possible tasks, such as browsing, searching, playing various forms of content, including locally stored or streamed video, or games (such as fantasy sports leagues). The foregoing is provided to illustrate that claimed subject matter is intended to include a wide range of possible features or capabilities.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure a system or module is a software, hardware, or firmware (or combinations thereof), process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
   receiving, by a processor, an input entity graph comprising at least one object, at least one target object that is a neighbor of the at least one object, and a plurality of attributes of the object;
   determining, by the processor, a specification comprising statistical rules for determining a subset of the plurality of attributes required for constructing a view that expedites data processing, the statistical rules comprising cosine similarity analysis;
   selecting, by the processor from the input entity graph and based on the statistical rules, the subset of the plurality of attributes required for the data processing, the subset of the plurality of attributes comprising respective subsets of attributes of the at least one object and the at least one target object;
   generating, by the processor, a pruned object and a pruned target object comprising the respective subsets of attributes selected based on the statistical rules for inclusion into the view; and generating, by the processor, the view comprising at least the pruned object.

2. The method of claim 1, wherein the specification further identifies a subset of the plurality of objects required for data processing and the selecting step further comprises:
selecting, by the processor from the input entity graph, the subset of the plurality of objects required for the data processing, the subset comprising at least a source object.

3. The method of claim 2, wherein the specification further identifies respective subsets of the attributes of the subset of the plurality of objects that are required for the data processing and the selecting step further comprises: selecting, by the processor from the input entity graph, respective subsets of the attributes of the subset of the plurality of objects that are required for the data processing based on the specification.

4. The method of claim 1, wherein the generated view further comprises the pruned source object and the pruned target objects.

5. The method of claim 1, the target objects are N level neighbors of the source object, N is greater than or equal to 1.

6. The method of claim 1, further comprising:
receiving, by the processor, a request related to the at least one object and the subset of the plurality of attributes.

7. The method of claim 6, further comprising: retrieving, by the processor, a response to the request from the view in a single iteration.

8. A computing device comprising:
a processor;
a storage medium for tangibly storing thereon program logic for execution by the processor, the program logic comprising:
graph receiving logic, executed by the processor, for receiving, an input entity graph comprising at least one object, at least one target object that is a neighbor of the at least one object, and a plurality of attributes of the object;
specification determining logic, executed by the processor, for determining a specification comprising statistical rules for determining a subset of the plurality of attributes required for constructing a view that expedites data processing, the statistical rules comprising cosine similarity analysis;
selecting logic, executed by the processor, for selecting, based on the statistical rules, from the input entity graph, the subset of the plurality of attributes required for the data processing, the subset of the plurality of attributes comprising respective subsets of attributes of the at least one object and the at least one target object;
object generating logic, executed by the processor, for generating a pruned object and a pruned target object comprising the respective subsets of attributes selected based on the statistical rules for inclusion into the view; and
view generating logic, executed by the processor, for generating the view comprising at least the pruned object.

9. The device of claim 8, wherein the specification further identifies a subset of the plurality of objects required for data processing and the selecting logic further comprises: object selecting logic, executed by the processor for selecting from the input entity graph, the subset of the plurality of objects required for the data processing, the subset comprising at least a source object.

10. The device of claim 9, wherein the specification further identifies respective subsets of the attributes of the subset of the plurality of objects that are required for the data processing and the selecting step further comprises: attribute subset selecting logic, executed by the processor for selecting from the input entity graph, respective subsets of the attributes of the subset of the plurality of objects that are required for the data processing based on the specification.

11. The device of claim 8, wherein the generated view further comprises the pruned source object and the pruned target objects.

12. The device of claim 8, the target objects are N level neighbors of the source object, N is greater than or equal to 1.

13. A non-transitory computer readable storage medium, comprising instructions, which when executed by a processor cause the processor to:
receive an input entity graph comprising at least one object, at least one target object that is a neighbor of the at least one object, and a plurality of attributes of the object;
determine a specification comprising statistical rules for determining a subset of the plurality of attributes required for constructing a view that expedites data processing, the statistical rules comprising cosine similarity analysis;
select from the input entity graph and based on the statistical rules, the subset of the plurality of attributes required for the data processing, the subset of the plurality of attributes comprising respective subsets of attributes of the at least one object and the at least one target object;
generate a pruned object and a pruned target object comprising the respective subsets of attributes selected based on the statistical rules for inclusion into the view; and
generate the view comprising at least the pruned object.

14. The non-transitory computer readable medium of claim 13, the target objects are N level neighbors of the source object, N is greater than or equal to 1.

15. The non-transitory computer readable medium of claim 13, the specification further comprises an inferred attribute that is inferred from at least one of the plurality of attributes.

16. The non-transitory computer readable medium of claim 15, the pruned object comprises the inferred attribute.

* * * * *